Patented Feb. 27, 1934

1,949,329

UNITED STATES PATENT OFFICE 1,949,329

MANUFACTURE OF OPTICALLY ACTIVE MENTHOLS

John Read, St. Andrews, and William John Grubb, Anstruther Wester, Scotland

No Drawing. Application February 21, 1933, Serial No. 657,922, and in Great Britain March 4, 1932

10 Claims. (Cl. 260—153)

Whilst racemic menthol has been resolved into its optically active constituents, the methods hitherto used have been laborious or have provided only small yields of the optically active substances (Journal of the Chemical Society, 1912, page 109 et seq; 1931, page 188).

This invention provides a simpler and more rapid and economical process for obtaining dextro-menthol or lævo-menthol or both from mixtures thereof (including racemic menthol and mixtures of racemic menthol with an optically active menthol). The process of the invention comprises converting the menthols into esters of an optically active menthoxy-acetic acid (lævo or dextro) and fractionally crystallizing the mixture of esters so obtained. The use of the lævo-acid leads to the production of the dextro-menthol, while the use of the dextro-acid leads to the production of the lævo-menthol. For example, where the lævo-acid is employed for the conversion of the menthols into their esters by fractionally crystallizing the resulting esters from one of the usual organic solvents, such as methyl alcohol, there can be obtained the pure dextro-menthol ester which on hydrolysis under suitable conditions yields pure dextro-menthol.

The optically active menthol of opposite direction of optical rotation (in the case of the example given above, lævo menthol) can be recovered from the mother liquors of the fractional crystallization by decomposing the esters remaining in the mother liquors, converting the liberated menthols into their esters of an optically active menthoxy-acetic acid whose direction of optical rotation is opposite to that of the acid whose esters were formed in the initial stage of the process, and fractionally crystallizing the esters so as to obtain a pure ester which on hydrolysis under suitable conditions yields the pure optically active menthol (in the case of the example given above, lævo menthol). The esters remaining in the mother liquors may be decomposed and the liberated menthols recovered and subjected again to the process.

Similarly, by treating the initial mixture of dextro- and lævo-menthols with dextro-menthoxy-acetic acid, a mixture of the dextro- and lævo-menthol esters of the dextro-acid may be obtained, from which the pure lævo-menthol ester may be isolated by fractional crystallization, which lævo-menthol ester on hydrolysis under suitable conditions yields pure lævo-menthol. From the menthols recovered from the mother liquors remaining after fractional crystallization, the dextro-menthol may be isolated by the use of lævo-menthoxy-acetic acid to produce the esters of the lævo-acid.

It is to be noted that menthoxy-acetic acid is itself capable of being decomposed by hydrolysis into menthol and acetic acid; hence for liberating the pure optically active menthols from their esters of menthoxy-acetic acid, care must be taken to avoid conditions of hydrolysis which would cause decomposition also of the menthoxy-acetic acid liberated in the course of the hydrolysis. A suitable procedure for obtaining the optically active menthols from the esters consists in heating the esters with a dilute alcoholic alkali solution, say a solution of about 1 per cent. strength.

The menthoxy-acetic acid may be recovered and used again in the process.

The invention permits the isolation, in a simple and economical manner, and in good yield, of substantially pure dextro-menthol and lævo-menthol. The pure products melt at 42–43° C. and have the odor and taste of the naturally occurring menthol.

The optically active menthoxy-acetic acids used in carrying out the invention may be made, for example, in the manner described in the Journal of the Chemical Society, 1931, pages 1932–1934; or an optically inactive menthoxy-acetic acid may be prepared from inactive menthol and resolved by any known method.

The menthol esters of the optically active menthoxy-acetic acids may be made by one of the usual methods of esterification, for instance, by reaction of the mixture of optically active menthols with an optically active menthoxy-acetyl chloride in presence of a tertiary base, such as pyridine or quinoline.

The following examples illustrate the invention:—

*Example 1.*—164 grams of racemic menthol are treated in solution in pyridine with the crude lævo-menthoxy-acetyl chloride made by heating 215 grams of lævo-menthoxy-acetic acid with thionyl chloride, whereby there were obtained 312.7 grams of the crude racemic menthol ester of lævo-menthoxy-acetic acid. 297 grams of this ester were recrystallized eight times from methyl alcohol and yielded 67 grams of the pure dextro-menthyl ester of lævo-menthoxy-acetic acid $$(\alpha_{[D]} = -6.3°),$$

corresponding with a yield of 45 per cent. of theory. By hydrolysis of this ester by means of dilute alcoholic potash of about 1 per cent. strength, there was obtained, in a yield of 83.5 per cent. of the theory, dextro-menthol having a melting point of 42–43° C., a boiling point of 99° C. at 12.5 mm pressure and an optical rotation in alcoholic solution $$\alpha_{[D]} = +49.95°.$$

*Example 2.*—The methyl alcoholic mother liquors of the recrystallizations described in Example 1 were treated in order to decompose the ester and recover the liberated menthol. 29 grams of the recovered menthol $$(\alpha_{[D]} = -29°)$$

were esterified by treatment with the theoretical quantity of dextro-menthoxy-acetyl chloride in pyridine, and the ester formed was isolated and recrystallized four times from methyl alcohol, whereby there was obtained the pure laevo-menthol ester of dextro-menthoxy-acetic acid $$(\alpha_{[D]} = +7.1°).$$

By saponifying the ester by means of dilute alcoholic potash of about 1 per cent. strength there was obtained a pure laevo-menthol having properties identical with those of the naturally occurring product, namely melting point=42–43° C., boiling point=93° C., under a pressure of 10 mm., and $$\alpha_{[D]} = -49.0°.$$

The mother liquors may be again worked up for recovery of the menthol and the recovered menthol may be treated again by the process of Example 1 or Example 2.

Having thus fully described the nature of the said invention and the best means we know of carrying the same into practical effect, what we claim as our invention is:—

1. A manufacture of an optically active menthol, which comprises converting a mixture of dextro-menthol and laevo-menthol into their esters of an optically active menthoxy-acetic acid, isolating one of the esters by fractional crystallization of the mixture of esters and hydrolyzing the isolated ester under conditions under which the menthoxy-acetic acid liberated during the hydrolysis is not decomposed.

2. A manufacture of an optically active menthol, which comprises decomposing the esters contained in the mother liquors of the crystallization referred to in claim 1, converting the liberated menthols into esters of an optically active menthoxy-acetic acid whose direction of optical rotation is opposite to that of the optically active menthoxy-acetic acid referred to in claim 1, isolating one of the esters by fractional crystallization of the mixture of esters thus obtained and hydrolyzing the isolated ester under conditions under which the menthoxy-acetic acid liberated during the hydrolysis is not decomposed.

3. A manufacture of dextro-menthol, which comprises converting a mixture of dextro-menthol and laevo-menthol into their esters of laevo-menthoxy-acetic acid, isolating the dextro-menthol ester by fractional crystallization of the mixture of esters and hydrolyzing the isolated ester under conditions under which the menthoxy-acetic acid liberated during the hydrolysis is not decomposed.

4. A manufacture of laevo-menthol, which comprises decomposing the esters contained in the mother liquors of the crystallization referred to in claim 3, converting the liberated menthols into esters of dextro-menthoxy-acetic acid, isolating the laevo-menthol ester by fractional crystallization of the mixture of esters and hydrolyzing the isolated ester under conditions under which the menthoxy-acetic acid liberated during the hydrolysis is not decomposed.

5. A manufacture of an optically active menthol which comprises converting a mixture of dextro-menthol and laevo-menthol into their esters of an optically active menthoxy-acetic acid, isolating one of the esters by fractional crystallization of the mixture of esters and hydrolyzing the isolated ester by means of a dilute alcoholic solution of an alkali.

6. A manufacture of an optically active menthol, which comprises decomposing the esters contained in the mother liquors of the crystallization referred to in claim 5, converting the liberated menthols into esters of an optically active menthoxy-acetic acid whose direction of optical rotation is opposite to that of the optically active menthoxy-acetic acid referred to in claim 5, isolating one of the esters by fractional crystallization of the mixture of esters thus obtained and hydrolyzing the isolated ester by means of a dilute alcoholic solution of an alkali.

7. A manufacture of dextro-menthol, which comprises converting a mixture of dextro-menthol and laevo-menthol into their esters of laevo-menthoxy-acetic acid, isolating the dextro-menthol ester by fractional crystallization of the mixture of esters and hydrolyzing the isolated ester by means of a dilute alcoholic solution of an alkali.

8. A manufacture of laevo-menthol, which comprises decomposing the esters contained in the mother liquors of the crystallization referred to in claim 7, converting the liberated menthols into esters of dextro-menthoxy-acetic acid, isolating the laevo-menthol ester by fractional crystallization of the mixture of esters and hydrolyzing the isolated ester by means of a dilute alcoholic solution of an alkali.

9. A process for the isolation of optically active menthols from a mixture of dextro-menthol and laevo-menthol, which comprises converting said mixture into their esters of an optically active menthoxy-acetic acid, fractionally crystallizing the mixture of esters to isolate one of the esters, and hydrolyzing the isolated ester under conditions under which the menthoxy-acetic acid liberated during the hydrolysis is not decomposed.

10. A process for the isolation of optically active menthols from a mixture of dextro-menthol and laevo-menthol, which comprises converting said mixture into their esters of an optically active menthoxy-acetic acid, fractionally crystallizing the mixture of esters to isolate one of the esters, hydrolyzing the isolated ester under conditions under which the menthoxy-acetic acid liberated during the hydrolysis is not decomposed, then decomposing the esters contained in the said mother liquors of crystallization remaining after the isolation of the first mentioned esters, converting the menthols liberated by such decomposition into esters of an optically active menthoxy-acetic acid whose direction of optical rotation is opposite to that of the first mentioned optically active menthoxy-acetic acid, fractionally crystallizing the mixture of esters thus obtained to isolate one of the esters, and hydrolyzing the isolated ester under conditions under which the menthoxy-acetic acid liberated during the hydrolysis is not decomposed.

JOHN READ.
WILLIAM JOHN GRUBB.